(12) United States Patent
Singh et al.

(10) Patent No.: US 11,599,842 B2
(45) Date of Patent: Mar. 7, 2023

(54) MODELING EXPECTATION MISMATCHES

(71) Applicant: Oracle International Corporation, Redwood Shores, CA (US)

(72) Inventors: Anand Kumar Singh, Hyderabad (IN); Manish Manish, Kolkata (IN); Mohamed Fazil, Bangalore (IN); Anirban Majumdar, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 213 days.

(21) Appl. No.: 17/149,910

(22) Filed: Jan. 15, 2021

(65) Prior Publication Data

US 2022/0230121 A1 Jul. 21, 2022

(51) Int. Cl.
*G06Q 10/0639* (2023.01)
*G06Q 10/105* (2023.01)
*G06F 40/30* (2020.01)
*G06F 40/284* (2020.01)
*G06N 3/08* (2023.01)
*G06F 7/552* (2006.01)

(52) U.S. Cl.
CPC ..... *G06Q 10/06398* (2013.01); *G06F 40/284* (2020.01); *G06F 40/30* (2020.01); *G06N 3/08* (2013.01); *G06Q 10/105* (2013.01); *G06F 7/5525* (2013.01)

(58) Field of Classification Search
CPC ............ G06Q 10/06398; G06Q 10/105; G06F 40/284; G06F 40/30; G06F 7/5525; G06N 3/08
See application file for complete search history.

(56) References Cited

U.S. PATENT DOCUMENTS

| | | | |
|---|---|---|---|
| 5,926,794 A | * | 7/1999 | Fethe ..................... G06Q 10/10 705/7.42 |
| 9,208,474 B2 | | 12/2015 | McKeown et al. |
| 2017/0140043 A1 | * | 5/2017 | Apte .................. G06Q 10/0639 |
| 2017/0236081 A1 | | 8/2017 | Smith et al. |
| 2018/0121823 A1 | | 5/2018 | Bauer et al. |

(Continued)

*Primary Examiner* — Dylan C White
(74) *Attorney, Agent, or Firm* — Potomac Law Group, PLLC (57) ABSTRACT

Embodiments determine mismatches in evaluations. Embodiments receive a first evaluation of an employee from a supervisor of the employee, the first evaluation including supervisor comment ratings and supervisor numerical ratings, each of the supervisor comment ratings and supervisor numerical ratings corresponding to an evaluation category. Embodiments receive a second evaluation of the employee from the employee, the second evaluation including employee comment ratings and employee numerical ratings, each of the employee comment ratings and employee numerical ratings corresponding to the evaluation category. Embodiments determine first sentiment polarity scores of the supervisor comment ratings and second sentiment polarity scores of the employee comment ratings. Embodiments determine polarity mismatch scores based on the first sentiment polarity scores and the second sentiment polarity scores and determine average differential ratings based on the supervisor numerical ratings and the employee numerical ratings. Embodiments combine the polarity mismatch scores and the average differential ratings.

17 Claims, 4 Drawing Sheets

(56) References Cited

U.S. PATENT DOCUMENTS

| | | | |
|---|---|---|---|
| 2018/0189691 A1* | 7/2018 | Oehrle | G06N 7/01 |
| 2020/0234208 A1* | 7/2020 | Childress | G06Q 10/06 |
| 2020/0286000 A1 | 9/2020 | Arpat et al. | |
| 2020/0394478 A1* | 12/2020 | Malak | G06F 40/205 |
| 2021/0019687 A1* | 1/2021 | Fisher | G06Q 10/063114 |
| 2022/0019956 A1* | 1/2022 | Childress | G06Q 10/0639 |
| 2022/0230121 A1* | 7/2022 | Singh | G06F 40/30 |
| 2022/0318719 A1* | 10/2022 | Dhingra | G06Q 10/063112 |

* cited by examiner

MODELING EXPECTATION MISMATCHES

FIELD

One embodiment is directed generally to a computer system, and in particular to modeling expectation mismatches with a computer system.

BACKGROUND INFORMATION

A performance appraisal, also referred to as a performance review, performance evaluation, or employee appraisal, is a method by which the job performance of an employee is documented and evaluated. Performance appraisals are a part of career development and consist of regular reviews of employee performance within organizations.

Performance appraisals are most often conducted by an immediate manager/supervisor, such as line managers or front-line managers. While assessment can be performed along reporting relationships (usually top-down), net assessment can include peer and self-assessment. Peer assessment is when assessment is performed by colleagues along both horizontal (similar function) and vertical (different function) relationships. Self-assessments are when individuals evaluate themselves.

Peer assessments and self-assessments are increasingly popular and are typically combined as a "360-degree feedback" (also known as multi-rater feedback, multi source feedback, or multi source assessment). 360-degree feedback is a process through which feedback from an employee's subordinates, colleagues, and supervisor(s), as well as a self-evaluation by the employee themselves is gathered. Such feedback can also include, when relevant, feedback from external sources who interact with the employee, such as customers and suppliers or other interested stakeholders. 360-degree feedback is so named because it solicits feedback regarding an employee's behavior from a variety of points of view (subordinate, lateral, and supervisory). It therefore may be contrasted with "downward feedback" (traditional feedback on work behavior and performance delivered to subordinates by supervisory or management employees only), or "upward feedback" delivered to supervisory or management employees by subordinates only.

Organizations have most commonly utilized 360-degree feedback for developmental purposes, providing it to employees to assist them in developing work skills and behaviors. However, organizations are increasingly using 360-degree feedback in performance evaluations and employment decisions (e.g., pay decisions, promotions, etc.). When 360-degree feedback is used for performance evaluation purposes, it is sometimes called a "360-degree review".

However, due to complexities in modeling and data analysis, most organizations rely primarily on or heavily emphasize the supervisor's evaluation over all of the evaluations. Enterprise-wide Human Capital Management systems in general fail to model or perform data analytics on the other sources of evaluations.

SUMMARY

Embodiments of the invention determine mismatches in evaluations. Embodiments receive a first evaluation of an employee from a supervisor of the employee, the first evaluation including supervisor comment ratings and supervisor numerical ratings, each of the supervisor comment ratings and supervisor numerical ratings corresponding to an evaluation category. Embodiments receive a second evaluation of the employee from the employee, the second evaluation including employee comment ratings and employee numerical ratings, each of the employee comment ratings and employee numerical ratings corresponding to the evaluation category. Embodiments determine first sentiment polarity scores of the supervisor comment ratings and second sentiment polarity scores of the employee comment ratings. Embodiments determine polarity mismatch scores based on the first sentiment polarity scores and the second sentiment polarity scores and determine average differential ratings based on the supervisor numerical ratings and the employee numerical ratings. Embodiments then combine the polarity mismatch scores and the average differential ratings to generate a final expectations mismatch score for the employee.

DETAILED DESCRIPTION

Embodiments receive evaluations in numerical and textual form from both a supervisor and respective employee via a self-assessment or a 360-degree review, as discussed above. Embodiments use data analysis and natural language processing to quantify and model expectation "mismatches" between employees and supervisors, and uses the mismatches as an added tool in the evaluation.

Often in Human Capital Management ("HCM") in any organization there are mismatches in expectations between employees and their supervisors. This generally remains unnoticed in known HCM business intelligence analysis/reporting systems because, as discussed above, the emphasis is typically on how the supervisor is rating the employees. The employee's perspective is rarely taken into consideration, even if the evaluation system receives this information. Therefore, if not identified early, mismatched expectations may lead to abrupt attritions or terminations. Still further, mismatched expectations impacts employee productivity and thus the organization itself.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
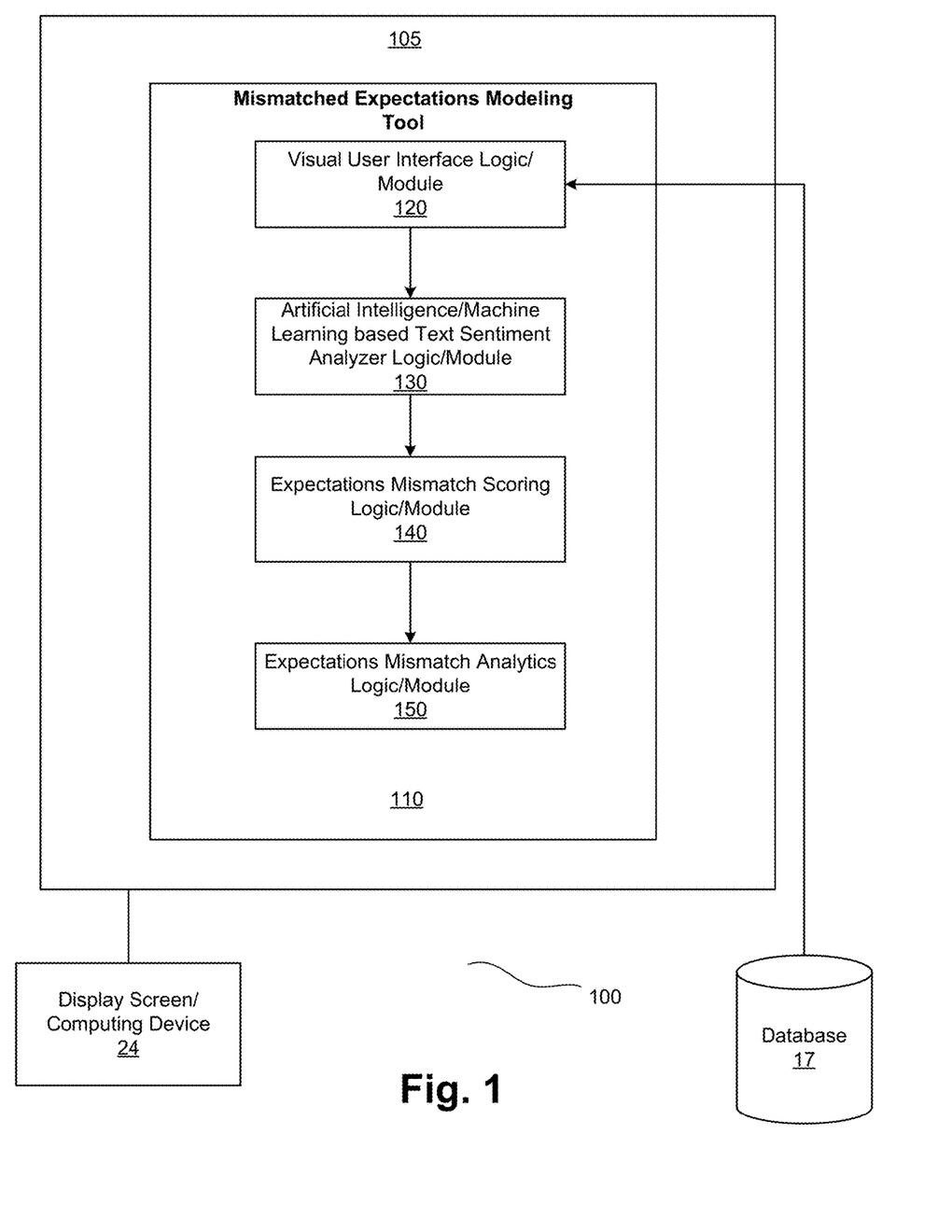
FIG. 1 illustrates a computer system having a computing device configured with a mismatched expectations modeling tool in accordance to embodiments.

FIG. 1 illustrates a computer system 100 having a computing device 105 configured with a mismatched expectations modeling tool 110 in accordance to embodiments. In one embodiment, mismatched expectations modeling tool 110 may be part of a larger computer application (e.g., an HCM application or an enterprise resource planning ("ERP") application). Mismatched expectations modeling tool 110 is configured to quantify and model the differences in expectations between supervisors and employees, and provide further analytics such as ratings and visual dashboards using different hierarchies and dimensions.

In one embodiment, system 100 is a computing/data processing system including an application or collection of distributed applications for enterprise organizations. The applications and computing system 100 may be configured to operate with or be implemented as a cloud-based networking system, a software-as-a-service ("SaaS") architecture, or other type of computing solution.

In one embodiment, mismatched expectations modeling tool 110 is implemented on computing device 105 and includes logics or modules for implementing various functional aspects of mismatched expectations modeling tool 110. In one embodiment, mismatched expectations modeling tool 110 includes a visual user interface logic/module 120, an artificial intelligence ("AI") based text sentiment analyzer logic/module 130, an expectations mismatch scoring logic/module 140, and an expectations mismatch analytics logic/module 150.

Other embodiments may provide different logics or combinations of logics that provide the same or similar functionality as mismatched expectations modeling tool 110 of FIG. 1. In one embodiment, mismatched expectations modeling tool 110 is an executable application including algorithms and/or program modules configured to perform the functions of the logics. The application is stored in a non-transitory computer storage medium. In one embodiment, mismatched expectations modeling tool 110 is implemented as modules of instructions stored on a computer-readable medium.

Computer system 100 also includes a display screen 24 operably connected to computing device 105. In accordance with one embodiment, display screen 24 is implemented to display views of and facilitate user interaction with a graphical user interface ("GUI") generated by visual user interface logic 120 for viewing and updating information associated with mismatched expectations (i.e., input ratings and comments, output rankings, analytical graphs, etc.). The graphical user interface may be associated with a mismatch expectations analytics and visual user interface logic 120 may be configured to generate the graphical user interface.

In one embodiment, computer system 100 is a centralized server-side application that provides at least the functions disclosed herein and that is accessed by many users via computing devices/terminals communicating with the computer system 100 (functioning as the server) over a computer network. Therefore, display screen 24 may represent multiple computing devices/terminals that allow users to access and receive services from mismatched expectations modeling tool 110 via networked computer communications.

In one embodiment, computer system 100 further includes at least one database 17 operably connected to computing device 105 and/or a network interface to access database 17 via a network connection. For example, in one embodiment, database 17 is operably connected to visual user interface logic 120. In accordance with one embodiment, database 17 is configured to store and manage data structures associated with mismatched expectations modeling tool 110 in a database system.

In one embodiment, visual user interface logic 120 is configured to generate a graphical user interface ("GUI") to facilitate user interaction with mismatched expectations modeling tool 110. For example, visual user interface logic 120 includes program code that generates and causes the graphical user interface to be displayed based on an implemented graphical design of the interface. In response to user actions and selections via the GUI, associated aspects of generating mismatched expectations analytics and modeling may be generated.

In one embodiment, artificial intelligence based text sentiment analyzer logic/module 130 is configured to use artificial intelligence ("AI") (e.g., a neural network) in certain embodiments to generate a sentiment and the polarity of the sentiment from comments by supervisors and employees, as disclosed below.

In one embodiment, expectations mismatch scoring logic/module 140 is configured to generate scoring from the sentiment generated by logic 130 as well as evaluation numeric ratings. In one embodiment, expectations mismatch analytics logic/module 150 is configured to generate analytics and modeling from the scoring generated by logic 140, including rankings and graphical interpretations of the mismatches.

In embodiments, the expectations mismatch scoring is generated as a specialized data structure that includes attributes of each of the employees and supervisors. In embodiments, the specialized data structure is in the form of an electronic document (e.g., an XML document) and is stored in database 17. A "data structure," as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

Figure 2:
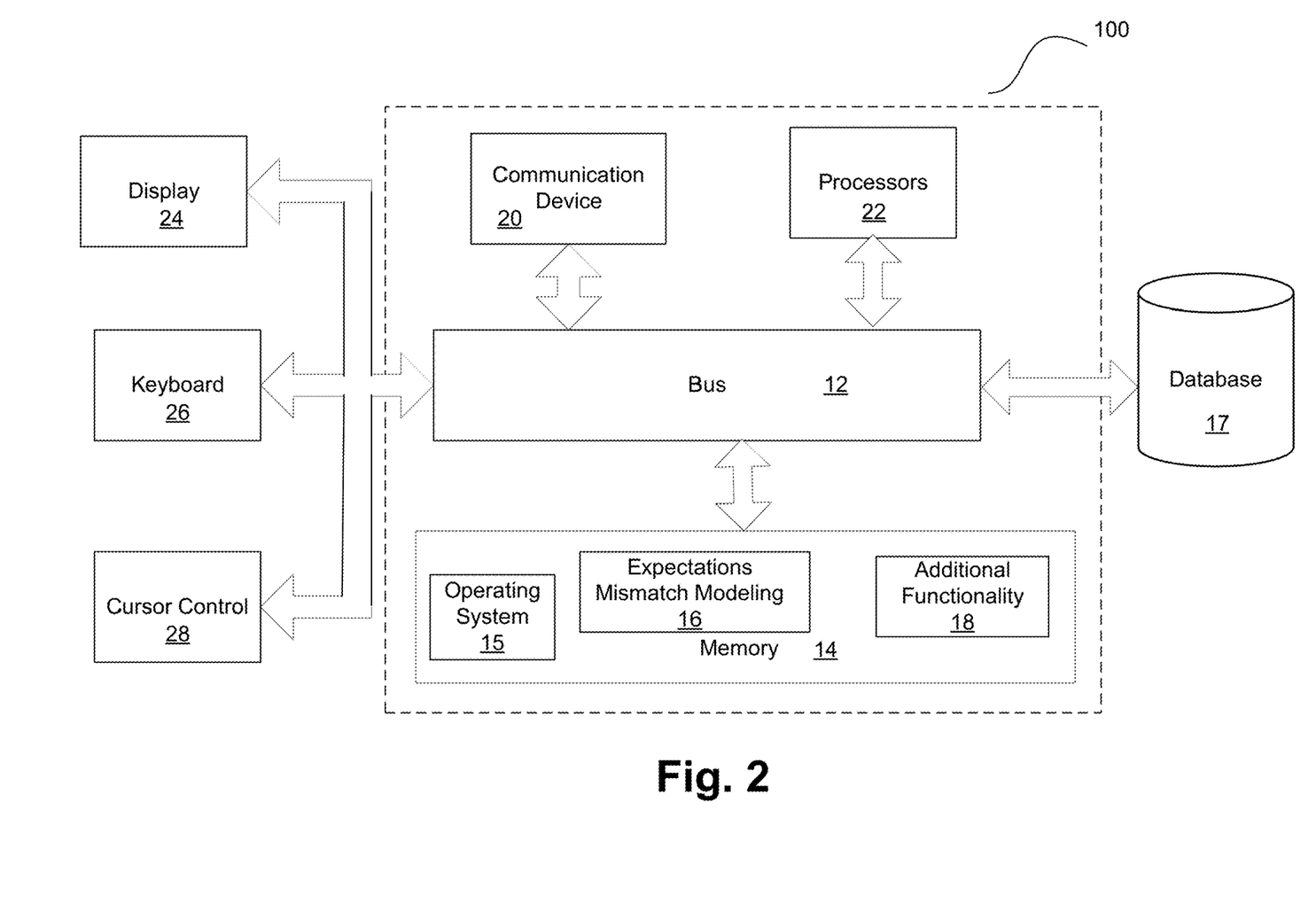
FIG. 2 is a block diagram of the computer server/system in accordance with an embodiment of the present invention.

FIG. 2 is a block diagram of computer server/system 100 in accordance with an embodiment of the present invention. FIG. 2 illustrates further hardware/software details of system 100. Although shown as a single system, the functionality of system 100 can be implemented as a distributed system. Further, the functionality disclosed herein can be implemented on separate servers or devices that may be coupled together over a network. Further, one or more components of system 100 may not be included. For example, for functionality of a server, system 100 may need to include a processor and memory, but may not include one or more of the other components shown in FIG. 2, such as a keyboard or display.

System 100 includes a bus 12 or other communication mechanism for communicating information, and a processor 22 coupled to bus 12 for processing information. Processor 22 may be any type of general or specific purpose processor. System 100 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 100 further includes a communication device 20, such as a network interface card, to provide access to a network. Therefore, a user may interface with system 100 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to display 24, such as a Liquid Crystal Display ("LCD"). A keyboard 26 and a cursor control device 28, such as a computer mouse, are further coupled to bus 12 to enable a user to interface with system 100.

In one embodiment, memory 14 stores software modules that provide functionality when executed by processor 22. The modules include an operating system 15 that provides operating system functionality for system 100. The modules further include an expectations mismatch modeling module 16 that implements one or more of modules 120, 130, 140, 150, and all other functionality disclosed herein. System 100 can be part of a larger system. Therefore, system 100 can include one or more additional functional modules 18 to include the additional functionality, such as an HCM enterprise application (e.g., the "Oracle Cloud Human Capital Management" from Oracle Corp.). Database 17 is coupled to bus 12 to provide centralized storage for modules 16 and 18 and store employee evaluation information, corporate hierarchies, etc. In one embodiment, database 17 is a relational database management system ("RDBMS") that can use Structured Query Language ("SQL") to manage the stored data.

In one embodiment, particularly when there are a large number supervisors and employees, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as a IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 100 is a computing/data processing system including an application or collection of distributed applications for enterprise organizations, and may also implement logistics, manufacturing, and inventory management functionality. The applications and computing system 100 may be configured to operate with or be implemented as a cloud-based networking system, a software-as-a-service ("SaaS") architecture, or other type of computing solution.

Figure 3:
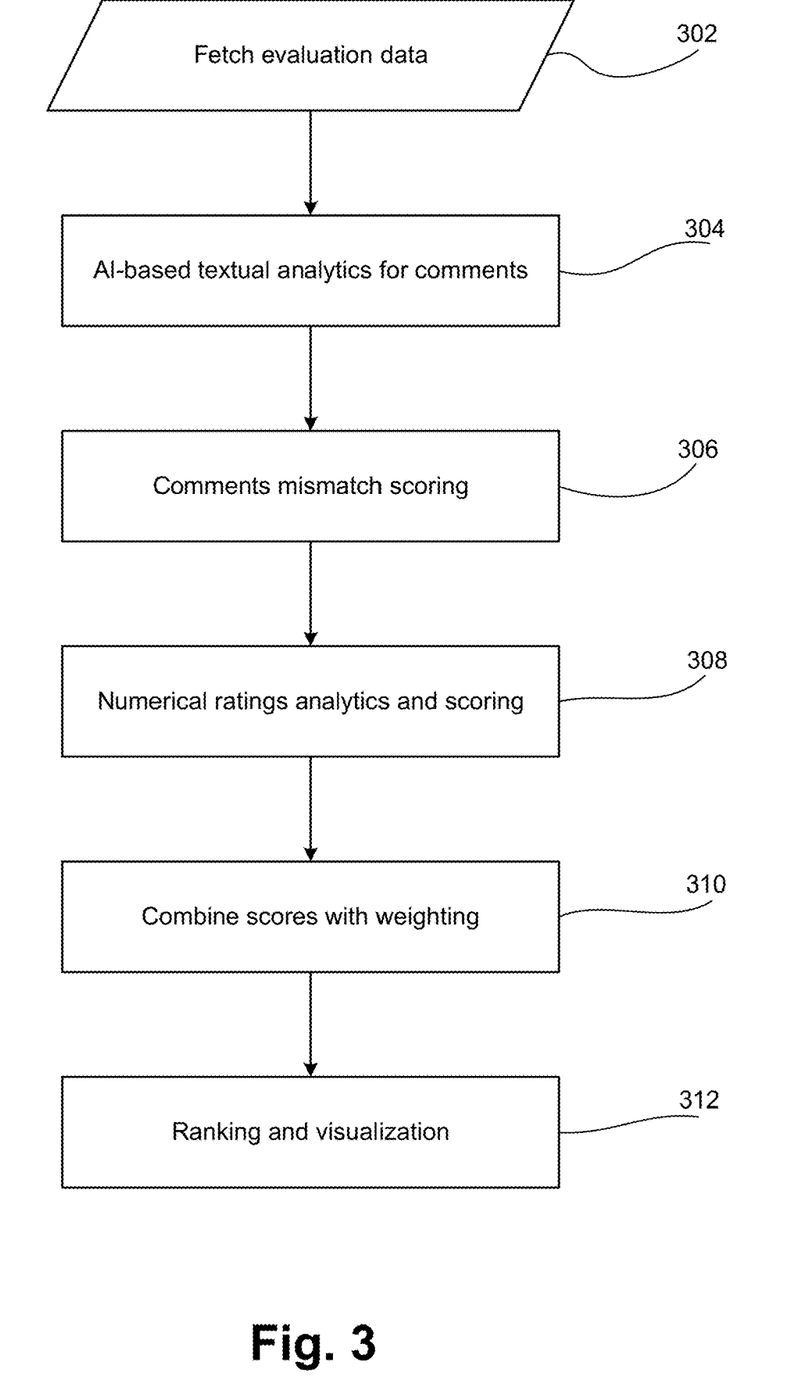
FIG. 3 is a flow diagram of the functionality of the mismatched expectations modeling tool of FIG. 1 when quantifying and modeling mismatched expectations between employees and supervisors in accordance with one embodiment.

FIG. 3 is a flow diagram of the functionality of mismatched expectations modeling tool 110 of FIG. 1 when quantifying and modeling mismatched expectations between employees and supervisors in accordance with one embodiment. In one embodiment, the functionality of the flow diagram of FIG. 3 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 302, embodiments fetch/retrieve input evaluation data, including both employee comments and ratings, and supervisor comments and ratings as part of a peer assessment, self-assessment or 360-degree review process. In embodiments, this data is retrieved from an HCM. Table 1 below illustrates some example input data:

TABLE 1

| Evaluation Cycle | Employee | Employee Comments | Supervisor Comments | Employee Rating | Supervisor Rating |
|---|---|---|---|---|---|
| Yearly Appraisal | 1 | I have met all expectations | Goodwork | 4 | 4 |
| Yearly Appraisal | 2 | I have performed exceedingly well | Need some improvement | 5 | 3 |
| Yearly Appraisal | 3 | I think I had a great year. I produced two new catalogues and hosted a successful trade fair. | Job well done | 4 | 4 |

The data includes in Table 1 includes the following

Evaluation Cycle—For each organization, appraisals are performed for a given evaluation cycle or as per the discretion of any particular organization (e.g., annually, semi-annually, etc.);

Employee—Unique identifier of the employee for whom the evaluation is being performed;

Employee Comments—Employee self-evaluation comments, which justifies the appraisal rating the person is expecting for each evaluation item;

Supervisor Comments—Comments provided by the Supervisor against each evaluation item in the evaluation document. This can be considered as the actual comments for each evaluation item (as opposed to the comments provided by the employee);

Employee Rating—Self-evaluation rating given by the employee as per his/her expectation;

Supervisor Rating—Numeric rating which the supervisor gives for the employee as per his/her evaluation. This can be considered as the actual rating for each evaluation item (as opposed to the rating provided by the employee).

Table 2 below is an expanded version of Table 1 in that it includes multiple evaluation categories (shown in the "Evaluation Category ID" column as 1231, 1232, 1233, etc.). For example, for single employee/supervisor pairings, evaluation categories may include "leadership", "communication", "attendance", "problem-solving", etc.

TABLE 2

| Eval Cycle | Evaluation Category Id | Employee | Department | Grade | Employee Comments | Supervisor Comments | Employee Rating | Supervisor Rating |
| --- | --- | --- | --- | --- | --- | --- | --- | --- |
| Yearly | 1231 | 1 | Sales | Executive | I am a high performer and very goal focused | Reallybad performance and not meeting org goals and below average performance | 4 | 1 |
| Yearly | 1232 | 1 | Sales | Executive | I have done a fine job | bad performance | 5 | 2 |
| Yearly | 1233 | 1 | Sales | Executive | Developed great relatonships which contribute to good team work | Not a good performance | 4 | 2 |
| Yearly | 1234 | 1 | Sales | Executive | Was a moderate performance | Room for improvement | 5 | 4 |
| Yearly | 1235 | 1 | Sales | Executive | contribute to good team work | this time Bad performance | 5 | 1 |
| Yearly | 1236 | 1 | Sales | Executive | my performance has remained consistent | Performance is worse when compared to last year | 4 | 2 |
| Yearly | 1237 | 2 | Sales | Executive | This time have done a good job | He have done a fine job | 5 | 2 |
| Yearly | 1238 | 2 | Sales | Executive | Safe to say I have done a good job | Did a fine job this time | 4 | 2 |
| Yearly | 1239 | 2 | Sales | Executive | did a okay job, do better in the coming review | Developed great relationships with team which contribute to good teamm work | 4 | 3 |
| Yearly | 1240 | 2 | Sales | Executive | I have done a great job | overall was a good year for him | 5 | 2 |
| Yearly | 1241 | 2 | Sales | Executive | Safe to say I have done a good job | could say he has done okay job | 4 | 2 |
| Yearly | 1242 | 2 | Sales | Executive | Safe to say I have done a good job | can improve his performance | 5 | 2 |
| Yearly | 1243 | 3 | Sales | Executive | I have done a fine job. Will improve | I think I have done a good job | 2 | 4 |
| Yearly | 1244 | 3 | Sales | Executive | I would say overall was a good year for me | I feel I have done a good job | 3 | 5 |
| Yeary | 1231 | 1 | Sales | Executive | I am a high performer and very goal focused | Really bad performance and not meeting org goals and below average performance | 4 | 1 |

After 302, the evaluation data in embodiments includes at least employee comments, supervisor comments, employee self-evaluation rating, supervisor rating, and employee and supervisor descriptive attributes (e.g., name, department and other details).

At 304, text analytics is performed on the comments received at 302. The textual analytics of the textual comments provided by both employees and supervisors are used to generate a sentiment polarity of each comment. In one embodiment, the lexicon based "TextBlob" python library is used to determine the polarity for employee and supervisor comments. The TextBlob library is a lexicon and rule-based sentiment analysis library. For lexicon-based approaches, a sentiment is defined by its semantic orientation and the intensity of each word in the sentence. Based on the polarity and subjectivity, it is determined whether it is a positive text or negative or neutral. For TextBlob, if the polarity is >0, it is considered positive, <0 is considered negative, and =0 is considered neutral.

In other embodiments, an artificial neural network or other type of artificial intelligence is used to perform the textual analytics, including sentiment analysis and polarity determination, at 304. In embodiments, the neural network is trained by processing examples, each of which contains a known "input" and "result," forming probability-weighted associations between the two, which are stored within the data structure of the net itself. The training of the neural network from a given example is conducted by determining the difference between the processed output of the network (often a prediction) and a target output, which is the "error". The network then adjusts its weighted associations according to a learning rule and using this error value. Successive adjustments cause the neural network to produce output which is increasingly similar to the target output. After a sufficient number of these adjustments the training is terminated based upon certain criteria, known as "supervised learning."

Further details on using a neural network or other AI type implementation to perform the textual analytics at 304 of semantic analysis and polarity assignment is disclosed, for example, in U.S. Pat. Pub. Nos. 2020/0394478, the disclosure of which is incorporated by reference. In this embodiment, a word embedding model including a first plurality of features is generated. A value indicating sentiment for the words in the first data set can be determined using a convolutional neural network ("CNN"). A second plurality of features are generated based on bigrams identified in the data set. The bigrams can be generated using a co-occurrence graph. The model is updated to include the second plurality of features, and sentiment analysis can be performed on a second data set using the updated model. In other embodiments, other techniques for using a neural network for semantic analysis and polarity assignment, such as disclosed in U.S. Pat. Pub. Nos. 2017/0249389 and 2020/0286000, are implemented. In other embodiments, any other text based sentiment analysis method to generate the sentiments polarity of any comment, including machine learning-based, lexicon-based or a hybrid approach or any other known form of Natural Language Processing ("NLP") can be used at 304.

Table 3 below illustrates some example polarity calculations at 304 in example embodiments.

TABLE 3

| Employee Comments | Supervisor Comments | Employee Comments polarity | Supervisor Comments polarity |
|---|---|---|---|
| I am a high performer and very goal focused | Really bad performance and not meeting org goals and below average performance | 0.18 | −0.425 |
| I have done a fine job | bad performance | 0.416666667 | −0.7 |
| Developed great relationships which contribute to good team work | Not a good performance | 0.533333333 | −0.35 |
| Was a moderate performance contribute to good team work | Room for improvement this time Bad performance | 0 0.7 | 0 −0.7 |
| my performance has remained consistent | Performance is worse when compared to last year | 0 | −0.2 |
| This time have done a good job | He have done a fine job | 0.7 | 0.416666667 |
| Safe to say I have done a good job | Did a fine job this time | 0.6 | 0.416666667 |
| did a okay job, do better in the coming review | Developed great relationships with team which contribute to good team work | 0.5 | 0.533333333 |
| I have done a great job | overall was a good year for him | 0.8 | 0.35 |
| Safe to say I have done a good job | could say he has done okay job | 0.6 | 0.5 |
| Safe to say I have done a good job | can improve his performance | 0.6 | 0 |
| I have done a fine job. Will improve | I think I have done a good job | 0.416666667 | 0.7 |
| I would say overall was a good year for me | I feel I have done a good job | 0.35 | 0.7 |

At 306, embodiments determine a mismatch "score" that quantifies the mismatch between the comments from the employee and the supervisor. Any comment that the employee gives is as per his/her expectation. Comments provided by the supervisor is the actual values from the perspective of any organization. Keeping this in perspective, the employee's expectation mismatch is determined as follows: (1) Determine the difference between the employee comment polarity and the supervisor comment polarity for each evaluation item; (2) Determine the square of the difference in polarity for each evaluation item; (3) Determine the summation of the square of the difference grouped by employee; (4) Count the number of evaluation items for each employee on which the person has been rated; (5) Divide the summation by the number of evaluation items for each employee; and (6) Determine the square root of the division output to get the final value of aggregated polarity mismatch score for each employee. Pseudo-code for performing this functionality is as follows:

For each employee, for each evaluation item

Expected polarity = Employee_Comment_Polarity

Actual polarity = Supervisor_Comment_Polarity

Count = Number of evaluation items per employee $$\text{Polarity\_Mismatch\_Score} = \sqrt[2]{\sum (\text{Expected polarity} - \text{Actual polarity})^2 / \text{Count}}$$

Table 4 below illustrates some example polarity mismatch scores between employee and supervisor as determined above:

TABLE 4

| Employee | Polarity_Mismatch_Score |
|---|---|
| 1 | 0.855691457 |
| 2 | 0.3385016 |
| 3 | 0.35256993 |

TABLE 4-continued

| Employee | Polarity_Mismatch_Score |
|---|---|
| 4 | 0.160727513 |
| 5 | 0.047324236 |

Embodiments then rescale the score to a 0-1 scale. The above polarity range is within −1 to 1, and embodiments convert the polarity values on a scale of 0 to 1. This allows it to be comparable with the numerical rating scores, calculated below, so they can be merged together. Pseudocode for comments rescaling is as follows:

Polarity_Scaled_Score=Polarity_Mismatch_Score/
   range of polarity Range of polarity in current
   example is 2 (between 1 and −1).

Table 5 below illustrates some example scaled polarity mismatch scores between employee and supervisor as determined above:

TABLE 5

| Employee | Polarity_Mismatch_Score | Polarity_Scaled_Score |
|---|---|---|
| 1 | 0.855691457 | 0.427845729 |
| 2 | 0.3385016 | 0.1692508 |
| 3 | 0.35256993 | 0.176284965 |
| 4 | 0.160727513 | 0.080363756 |
| 5 | 0.047324236 | 0.023662118 |

At 308, embodiments implement numerical ratings analytics of the numerical ratings provided by the employees and supervisors. As input are the numerical ratings from the employee and supervisor—a self-rating that the employee gives which reflects the employee's expectation and the ratings given by the employee's supervisor that is the actual rating from the perspective of the organization. Embodiments perform analytics to determine if there is a mismatch against the employee.

For each employee, embodiments check and store the average difference in the employee and supervisor ratings. If the average difference is positive, this means it is not as per the employee's expectation. If the average is negative it denotes a hand-in-hand scenario (i.e., some kind of unethical understanding to favor an employee/supervisor). Pseudocode for the ratings analytics is as follows:

Difference_in_Rating=Employee_Rating−Supervisor_Rating Avg_Diff_Rating=Mean(Difference In Rating)

Table 6 below illustrates some example rating differentials between employee and supervisor as determined above:

TABLE 6

| Employee | Avg Diff Rating |
|---|---|
| 1 | 2.5 |
| 2 | 2.333333333 |
| 3 | −2 |
| 4 | 0.25 |
| 5 | 1.5 |

Next, for each employee, embodiments determine a mismatch score based on the expected versus actual numerical appraisal ratings. Embodiments determine the mismatch score as follows: (1) Determine the difference between the employee rating and the supervisor rating for each item/category; (2) Determine the square of the difference in rating for each item; (3) Determine the summation of the square of the difference grouped by employee; (4) Count the number of items for each employee; (5) Divide the summation by the number of items for each employee; and (6) Determine the square root of the division output to get the final value of aggregated rating mismatch score for each employee. Pseudocode for determining the numerical rating mismatch score is as follows:

For each employee, for each evaluation item

Expected rating = Employee_self_rating

Actual rating = Supervisor_rating

Count = Number of evaluation items per employee

Rating_Mismatch_Score =

$$\sqrt[2]{\sum (\text{Expected rating} - \text{Actual rating})^2 / \text{Count}}$$

Table 7 below illustrates some example numerical rating mismatch score differentials between an employee and supervisor as determined above:

TABLE 7

| Employee | Rating_Mismatch_Score |
|---|---|
| 1 | 2.677063067 |
| 2 | 2.449489743 |
| 3 | 2.121320344 |
| 4 | 0.5 |
| 5 | 1.58113883 |

Embodiments then re-scale the score on a 0-1 scale because the rating range depends on the minimum and maximum values of the rating model. This is so the numerical rating scores are comparable with the comments polarity scores. In examples, the rating scale is 1-5 and therefore the maximum difference can be 4. Different scales can be used in other embodiments. Pseudocode for numerical ratings rescaling is as follows:

Rating_Scaled_Score=Rating_Mismatch_Score/Range of rating difference Range of rating difference in current example is 4 (for rating on a scale of 1-5).

Table 8 below illustrates some example scaled numerical rating mismatch scores between employee and supervisor as determined above:

TABLE 8

| Employee | Rating_Mismatch_Score | Rating_Scaled_Score |
|---|---|---|
| 1 | 2.677063067 | 0.669265767 |
| 2 | 2.449489743 | 0.612372436 |
| 3 | 2.121320344 | 0.530330086 |
| 4 | 0.5 | 0.125 |
| 5 | 1.58113883 | 0.395284708 |

At 310, the comment based scaled scores from 306 and the numerical rating based scaled scores from 308 are combined to generate what is referred to as the final expectation mismatch score ("FEMS"). Because text/comment based polarity scores are more error prone as it has various dependencies, embodiments individually weight each of the scores to generate a final score. In one example, the following weighting is used:

Comment Weighting—40%

Rating Weighting—60%

The weighting can be changed based on the accuracy of the text analysis model or based on other factors. Pseudocode for score weighting is as follows:

For each employee:

Final_Expectation_Mismatch_Score (FEMS)=Polarity_Scaled_Score*Weight_Comments+Rating_Scaled_Score*Weight_Rating*Weight_Comments−0.4, Weight_Rating−0.6

Table 9 below illustrates some example final expectation mismatch scores ("FEMS") as determined above:

TABLE 9

| Employee | Avg_Diff_Rating | Rating_Scaled_Score | Polarity_Scaled_Score | FEMS |
|---|---|---|---|---|
| 1 | 2.5 | 0.669265767 | 0.427845729 | 0.572698 |
| 2 | 2.333333333 | 0.612372436 | 0.1692508 | 0.435124 |
| 3 | -2 | 0.530330086 | 0.176284965 | 0.388712 |
| 4 | 0.25 | 0.125 | 0.080363756 | 0.107146 |
| 5 | 1.5 | 0.395284708 | 0.023662118 | 0.246636 |

At 312, embodiments rank the scores and create visualization of the scores for additional analytic insight. Embodiments divide the scoring into two categories: (1) General cases; and (2) Exception cases where an employee's average self-rating is lower (i.e., worse) than the supervisor rating. These cases are identified on the basis of the "Avg_Diff_Rating" determined above. If the Avg_Diff_Rating for an employee is negative, it is considered as an exception. Otherwise, it is a general case.

Using the above example, the general cases and exception case is shown in the tables below:

| Employee | FEMS |
|---|---|
| General Case | |
| 6 | 0.631174677 |
| 1 | 0.572697752 |
| 2 | 0.435123781 |
| 5 | 0.246635672 |
| 4 | 0.107145503 |
| Exception Case | |
| 3 | 0.3887120375383 |

The mismatch scores generated by embodiments are at a per-employee level and can be determined for any evaluation cycle. The scores can be used as an independent variable in various analysis, such as determining attrition (i.e., determine employees most likely to leave) or for any employee-based recommendations where a training or a promotion or transfer can be proposed to retain the employee.

Further, the scores can be input into a dashboard application for people such as chief human resource officer ("CHRO"), executives, etc., as it can easily be sliced and diced at Manager Hierarchies to find top unsatisfied employees or a count of unsatisfied employees.

Figure 4A:
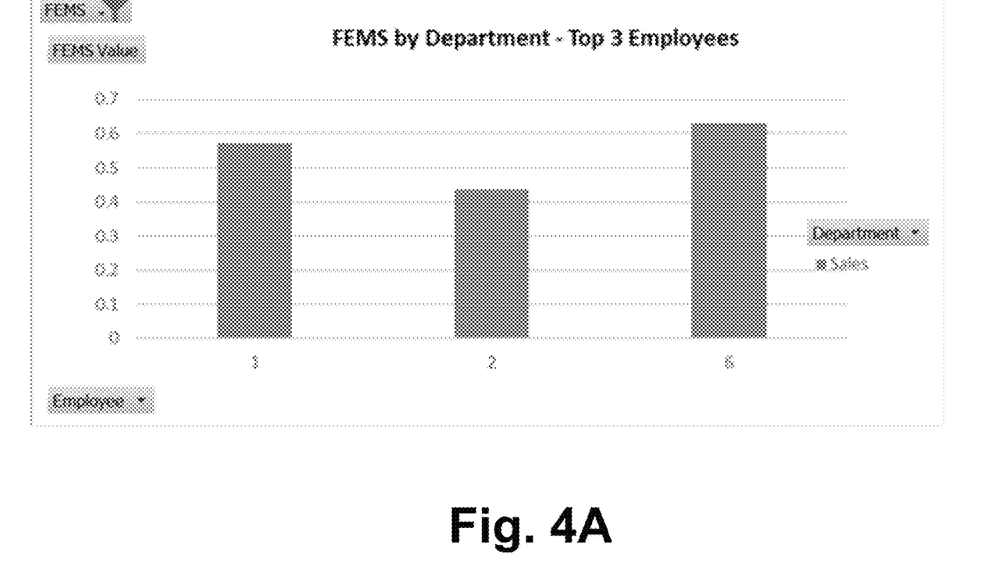
FIGS. 4A and 4B are dashboard visualizations using scores determined by embodiments of the invention.
Figure 4B:
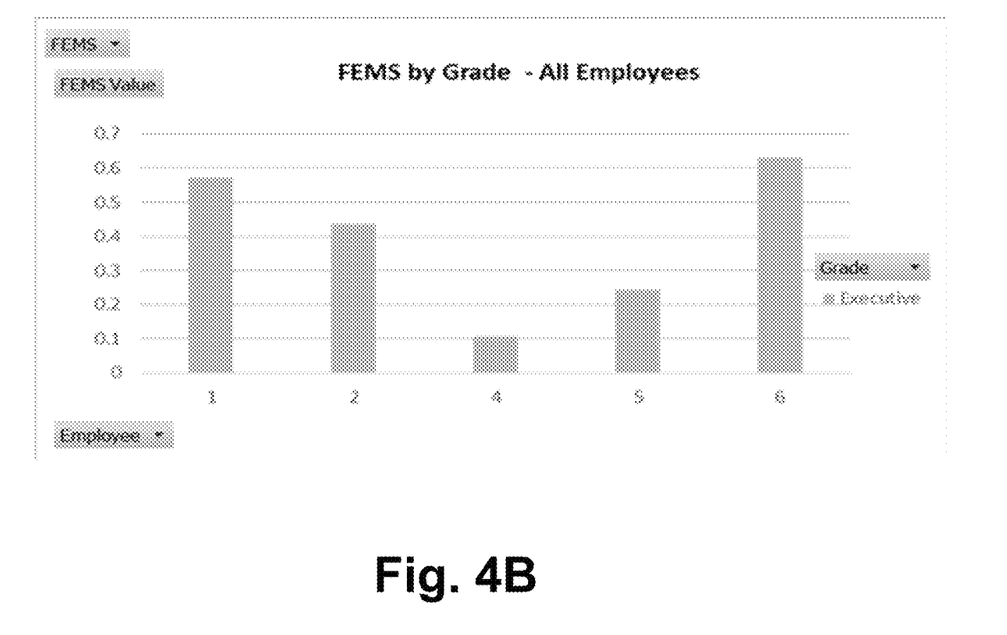

These scores pull out and summarize only meaningful data from the less important data on any dashboard specifically designed for CHRO or executives to provide a fine grain analysis using dimensions. For example, FIGS. 4A and 4B are dashboard visualizations using the scores determined by embodiments of the invention. FIG. 4A illustrates the top 3 employee FEMS by department. FIG. 4B illustrates the FEMS by grade of all employees as the average FEMS score per grade.

As disclosed, embodiments, leverage multiple aspects of appraisal evaluations in one single frame to provide a holistic understanding of employee-supervisor relations. Embodiments provide a holistic approach by including the employee's perspective along with the supervisor's perspective, which includes comments from various participants as well as their numerical ratings. Embodiments combine employee-supervisor sentiment mismatch with employee-supervisor rating mismatch on the evaluations done by managers to judge an overall mismatch in expectation in terms of a scored (i.e., the FEMS).

Embodiments can be re-used with many other models on various use cases such as attrition or recommendations on employees in HCM and can be used in systems such as talent management, global human resources, performance management, etc. Embodiments can be used with dimensional querying to provide a list of Supervisors/Managers for whom the overall satisfaction scores are either high or low and take necessary actions. Embodiments can also be used to provide information such as mismatch on performance goals, mismatch on development goals etc.

Embodiments provide a novel perspective to employee satisfaction under a manager hierarchy, a new metric which compares the comments of all the participants and the corresponding ratings in one single analysis and provides a consolidated score on expectation mismatch of employee. Because the generated scores are at the employee level, a dashboard application can be used to slice and dice the data at manager hierarchies to find top unsatisfied employees or generate a count of unsatisfied employees. The scoring can also be sliced on evaluation item types, such as development goals or performance goals. Each type either can be scored together or separately, thus providing a novel metric in HCM that enhances attritions or terminations models and can also be used in various recommendation model on employee or managers. Embodiments help in early diagnosis of Employee-Supervisor relations and as a result helps in increasing productivity and job satisfaction. In embodiments where there is no text analytics support, the ranking can be performed using only the numeric rating model.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of determining mismatches in evaluations, the method comprising:
receiving by one or more processors a first evaluation of an employee from a supervisor of the employee, the first evaluation comprising one or more supervisor comment ratings and one or more supervisor numerical ratings, each of the supervisor comment ratings and supervisor numerical ratings corresponding to an evaluation category;
receiving by the processors a second evaluation of the employee from the employee, the second evaluation comprising one or employee comment ratings and one or more employee numerical ratings, each of the employee comment ratings and employee numerical ratings corresponding to the evaluation category;
determining by the processors one or more first sentiment polarity scores of the supervisor comment ratings and one or more second sentiment polarity scores of the employee comment ratings comprising training a neural network and using the trained neural network to determine if the comment ratings are positive or negative and assigning a corresponding polarity value;

determining by the processors one or more polarity mismatch scores based on the first sentiment polarity scores and the second sentiment polarity scores;

determining by the processors one or more average differential ratings based on the supervisor numerical ratings and the employee numerical ratings; and combining by the processors the polarity mismatch scores and the average differential ratings to generate a final expectations mismatch score for the employee;

the neural network training comprising forming probability-weighted associations between input and results, adjusting weighted associations and repeating the forming probability-weighted associations between inputs and results until a criteria is reached; and generating the final expectations mismatch score as a specialized data structure.

2. The method of claim 1, the determining one or more first sentiment polarity scores of the supervisor comment ratings and one or more second sentiment polarity scores of the employee comment ratings comprising:

using a lexicon and rule-based sentiment analysis to determine if the comment ratings are positive or negative and assigning a corresponding polarity value.

3. The method of claim 1, the determining one or more polarity mismatch scores based on the first sentiment polarity scores and the second sentiment polarity scores comprising:

for each of the evaluation categories, determining a difference between the second sentiment polarity score and the first sentiment polarity score;

for each of the evaluation categories, determining a square of the difference in polarity;

determining a summation of the square of the differenced grouped by the employee;

counting a number of evaluation categories for each employee;

dividing the summation by the number of evaluation categories; and determining a square root of the dividing to generate a final value of aggregated polarity mismatch score for the employee.

4. The method of claim 1, the determining one or more average differential ratings based on the supervisor numerical ratings and the employee numerical ratings comprising:

for each of the evaluation categories, determining a difference between the employee numerical rating and the supervisor numerical rating;

for each of the evaluation categories, determining a square of the difference;

determining a summation of the square of the difference grouped by the employee;

counting a number of evaluation categories for each employee;

dividing the summation by the number of evaluation categories; and determining a square root of the dividing to get a final value of an aggregated rating mismatch score for the employee.

5. The method of claim 1, further comprising generating a visualization of the final expectations mismatch scores using a supervisor hierarchy level, the visualization comprising a dashboard and dimensions.

6. The method of claim 1, further comprising weighting the polarity mismatch scores and the average differential ratings before combining.

7. A non-transitory computer-readable medium having instructions stored thereon that, when executed by one or more processors, cause the processors to determine mismatches in evaluations, the determining mismatches comprising:

receiving a first evaluation of an employee from a supervisor of the employee, the first evaluation comprising one or more supervisor comment ratings and one or more supervisor numerical ratings, each of the supervisor comment ratings and supervisor numerical ratings corresponding to an evaluation category;

receiving a second evaluation of the employee from the employee, the second evaluation comprising one or employee comment ratings and one or more employee numerical ratings, each of the employee comment ratings and employee numerical ratings corresponding to the evaluation category;

determining one or more first sentiment polarity scores of the supervisor comment ratings and one or more second sentiment polarity scores of the employee comment ratings comprising training a neural network and using the trained neural network to determine if the comment ratings are positive or negative and assigning a corresponding polarity value;

determining one or more polarity mismatch scores based on the first sentiment polarity scores and the second sentiment polarity scores;

determining one or more average differential ratings based on the supervisor numerical ratings and the employee numerical ratings; and combining the polarity mismatch scores and the average differential ratings to generate a final expectations mismatch score for the employee;

the neural network training comprising forming probability-weighted associations between input and results, adjusting weighted associations and repeating the forming probability-weighted associations between inputs and results until a criteria is reached; and generating the final expectations mismatch score as a specialized data structure.

8. The computer-readable medium of claim 7, the determining one or more first sentiment polarity scores of the supervisor comment ratings and one or more second sentiment polarity scores of the employee comment ratings comprising:

using a lexicon and rule-based sentiment analysis to determine if the comment ratings are positive or negative and assigning a corresponding polarity value.

9. The computer-readable medium of claim 7, the determining one or more polarity mismatch scores based on the first sentiment polarity scores and the second sentiment polarity scores comprising:

for each of the evaluation categories, determining a difference between the second sentiment polarity score and the first sentiment polarity score;

for each of the evaluation categories, determining a square of the difference in polarity;

determining a summation of the square of the differenced grouped by the employee;

counting a number of evaluation categories for each employee;

dividing the summation by the number of evaluation categories; and determining a square root of the dividing to generate a final value of aggregated polarity mismatch score for the employee.

10. The computer-readable medium of claim 7, the determining one or more average differential ratings based on the supervisor numerical ratings and the employee numerical ratings comprising:

for each of the evaluation categories, determining a difference between the employee numerical rating and the supervisor numerical rating;
for each of the evaluation categories, determining a square of the difference;
determining a summation of the square of the difference grouped by the employee;
counting a number of evaluation categories for each employee;
dividing the summation by the number of evaluation categories; and
determining a square root of the dividing to get a final value of an aggregated rating mismatch score for the employee.

11. The computer-readable medium of claim 7, further comprising generating a visualization of the final expectations mismatch scores using a supervisor hierarchy level, the visualization comprising a dashboard and dimensions.

12. The computer-readable medium of claim 7, further comprising weighting the polarity mismatch scores and the average differential ratings before combining.

13. A human capital management system comprising: one or more processors programmed to determine mismatches in evaluations, the determining mismatches comprising:

receiving a first evaluation of an employee from a supervisor of the employee, the first evaluation comprising one or more supervisor comment ratings and one or more supervisor numerical ratings, each of the supervisor comment ratings and supervisor numerical ratings corresponding to an evaluation category;
receiving a second evaluation of the employee from the employee, the second evaluation comprising one or employee comment ratings and one or more employee numerical ratings, each of the employee comment ratings and employee numerical ratings corresponding to the evaluation category;
determining one or more first sentiment polarity scores of the supervisor comment ratings and one or more second sentiment polarity scores of the employee comment ratings comprising training a neural network and using the trained neural network to determine if the comment ratings are positive or negative and assigning a corresponding polarity value;
determining one or more polarity mismatch scores based on the first sentiment polarity scores and the second sentiment polarity scores;
determining one or more average differential ratings based on the supervisor numerical ratings and the employee numerical ratings; and
combining the polarity mismatch scores and the average differential ratings to generate a final expectations mismatch score for the employee;

the neural network training comprising forming probability-weighted associations between input and results, adjusting weighted associations and repeating the forming probability-weighted associations between inputs and results until a criteria is reached; and
generating the final expectations mismatch score as a specialized data structure.

14. The human capital management system of claim 13, the determining one or more first sentiment polarity scores of the supervisor comment ratings and one or more second sentiment polarity scores of the employee comment ratings comprising:

using a lexicon and rule-based sentiment analysis to determine if the comment ratings are positive or negative and assigning a corresponding polarity value.

15. The human capital management system of claim 13, the determining one or more polarity mismatch scores based on the first sentiment polarity scores and the second sentiment polarity scores comprising:

for each of the evaluation categories, determining a difference between the second sentiment polarity score and the first sentiment polarity score;
for each of the evaluation categories, determining a square of the difference in polarity;
determining a summation of the square of the differenced grouped by the employee;
counting a number of evaluation categories for each employee;
dividing the summation by the number of evaluation categories; and
determining a square root of the dividing to generate a final value of aggregated polarity mismatch score for the employee.

16. The human capital management system of claim 13, the determining one or more average differential ratings based on the supervisor numerical ratings and the employee numerical ratings comprising:

for each of the evaluation categories, determining a difference between the employee numerical rating and the supervisor numerical rating;
for each of the evaluation categories, determining a square of the difference;
determining a summation of the square of the difference grouped by the employee;
counting a number of evaluation categories for each employee;
dividing the summation by the number of evaluation categories; and
determining a square root of the dividing to get a final value of an aggregated rating mismatch score for the employee.

17. The human capital management system of claim 13, further comprising generating a visualization of the final expectations mismatch scores using a supervisor hierarchy level, the visualization comprising a dashboard and dimensions.

* * * * *

UNITED STATES PATENT AND TRADEMARK OFFICE
CERTIFICATE OF CORRECTION

| | |
|---|---|
| PATENT NO. | : 11,599,842 B2 |
| APPLICATION NO. | : 17/149910 |
| DATED | : March 7, 2023 |
| INVENTOR(S) | : Singh et al. |

It is certified that error appears in the above-identified patent and that said Letters Patent is hereby corrected as shown below:

In the Specification

In Columns 7-8, Line 50 (TABLE 2), delete "Yeary" and insert -- Yearly --, therefor.

In Column 10, Line 7, delete "evaluation" and insert -- evaluations --, therefor.

In Column 11, Lines 27-28, delete "(Difference In Rating)" and insert -- (Difference_In_Rating) --, therefor.

In Column 11, Line 62, delete "evaluation" and insert -- evaluations --., therefor.

In Column 13, Line 20, delete "Rating"determined" and insert -- Rating" determined --, therefor.

In the Claims

In Column 14, Line 61, in Claim 1, delete "one or" and insert -- one or more --, therefor.

In Column 16, Line 17, in Claim 7, delete "one or" and insert -- one or more --, therefor.

In Column 17, Line 39, in Claim 13, delete "one or" and insert -- one or more --, therefor.

Signed and Sealed this
Second Day of January, 2024

Katherine Kelly Vidal
*Director of the United States Patent and Trademark Office*